United States Patent
Koukes et al.

(10) Patent No.: US 9,330,061 B2
(45) Date of Patent: May 3, 2016

(54) DETERMINATION OF STEERING ANGLE FOR A MOTOR VEHICLE

(75) Inventors: Vladimir Koukes, Darmstadt (DE); Robert Schmidt, Kelkheim (DE); Mathias Niepelt, Friedberg (DE); Jochen Führer, Darmstadt (DE); Ralf Herbst, Nastätten (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 13/818,795

(22) PCT Filed: Sep. 9, 2011

(86) PCT No.: PCT/EP2011/065588
§ 371 (c)(1),
(2), (4) Date: Feb. 25, 2013

(87) PCT Pub. No.: WO2012/032133
PCT Pub. Date: Mar. 15, 2012

(65) Prior Publication Data
US 2013/0151066 A1    Jun. 13, 2013

(30) Foreign Application Priority Data

Sep. 9, 2010    (DE) .......................... 10 2010 040 532
Sep. 8, 2011    (DE) .......................... 10 2011 082 364

(51) Int. Cl.
*G06F 11/30* (2006.01)
*G07C 5/00* (2006.01)
(Continued)

(52) U.S. Cl.
CPC ............. *G06F 17/00* (2013.01); *B60T 8/17551* (2013.01); *B62D 15/0245* (2013.01); *B60T 2250/06* (2013.01); *B60T 2270/86* (2013.01)

(58) Field of Classification Search
CPC .... B62D 15/021; B62D 15/024; B62D 15/02; B62D 15/0245
USPC ...................................................... 701/41, 42
See application file for complete search history.

(56) References Cited

U.S. PATENT DOCUMENTS

| 5,790,966 A | 8/1998 | Madau et al. |
| 8,326,491 B2 | 12/2012 | Gärtner |

(Continued)

FOREIGN PATENT DOCUMENTS

| DE | 697 14 806 | 12/2002 |
| DE | 10 2008 063 567 | 4/2010 |

(Continued)

OTHER PUBLICATIONS

International Search Report corresponding to PCT/EP2011/065588, dated Nov. 29, 2011.

(Continued)

*Primary Examiner* — Imran Mustafa
(74) *Attorney, Agent, or Firm* — RatnerPrestia (57) ABSTRACT

Method and control device for determining a steering angle of a motor vehicle, wherein a theoretical steering angle is calculated by a vehicle model and a measured steering angle is determined with a steering angle sensor, and the difference between the measured and theoretical steering angles is determined, wherein at least one data record including a number of successive measured values is acquired, and a correction constant for the measured steering angle is determined from the mean value of the differences between the theoretical steering angle and the measured steering angle. According to the invention, a confidence level, which changes incrementally between successive data records, is calculated by travel conditions present during the acquisition of the data record and/or an analysis of the data record.

12 Claims, 3 Drawing Sheets

(51) Int. Cl.
  *G01M 17/00* (2006.01)
  *G06F 7/00* (2006.01)
  *G06F 19/00* (2011.01)
  *G06F 17/00* (2006.01)
  *B60T 8/1755* (2006.01)
  *B62D 15/02* (2006.01)

(56) References Cited

U.S. PATENT DOCUMENTS

| | | | | |
|---|---|---|---|---|
| 2003/0033071 | A1* | 2/2003 | Kawasaki | F16H 59/66 |
| | | | | 701/80 |
| 2003/0212476 | A1* | 11/2003 | Aanen | B62D 15/02 |
| | | | | 701/1 |
| 2004/0117088 | A1* | 6/2004 | Dilger | B62D 15/02 |
| | | | | 701/41 |
| 2008/0270021 | A1* | 10/2008 | Yamada | G08G 1/0104 |
| | | | | 701/533 |
| 2011/0301815 | A1* | 12/2011 | Koukes | B60T 8/1755 |
| | | | | 701/42 |

FOREIGN PATENT DOCUMENTS

| | | |
|---|---|---|
| EP | 1 388 483 | 2/2004 |
| EP | 1 627 799 | 2/2006 |
| KR | 10 2008 026 233 | 12/2009 |
| WO | WO 2007/113332 | 10/2007 |

OTHER PUBLICATIONS

German Search Report corresponding to DE 10 2011 082 364.6, dated May 16, 2012.
Chinese Office Action corresponding to application No. CN 201180043549.3, dated Jan. 9, 2014.

* cited by examiner

DETERMINATION OF STEERING ANGLE FOR A MOTOR VEHICLE

CROSS REFERENCE TO RELATED APPLICATIONS

This application is the U.S. National Phase Application of PCT International Application No. PCT/EP2011/065588, filed Sep. 9, 2011, which claims priority to German Patent Application No. 10 2010 040 532.9, filed Sep. 9, 2010, and German Patent Application No. 10 2011 082 364.6, filed Sep. 8, 2011, the contents of such applications being incorporated by reference herein.

FIELD OF THE INVENTION

The invention relates to a method in which the steering angle of a motor vehicle is determined and to a control unit for determining a steering angle of a vehicle.

BACKGROUND OF THE INVENTION

Cost-effective sensors for measuring the steering wheel angle supply relative values which give the angle of the steering wheel related to the steering wheel position at the starting of the ignition of the motor vehicle. Irrespective of whether a center position of the steering wheel is present at the starting of the ignition (that is to say at the start of a journey), the steering wheel angle sensor displays a zero value or a random value at the beginning. In general, the measured steering wheel angle therefore differs from the actual steering angle by a fixed angle, i.e. a zero point shift or offset of the steering wheel at the start of ignition, which actual steering angle is zero degrees in the case of straight-ahead travel of the vehicle, that is to say a center position of the steering wheel. However, for the safety of the vehicle precise knowledge of the actual steering angle is indispensable since the latter constitutes an essential measurement variable for vehicle dynamics control systems such as a yaw moment controller (ESC). It is therefore necessary to determine and to correct the zero point shift of the measured steering wheel angle.

DE 697 14 806 T2, which is incorporated by reference, (and the corresponding U.S. Pat. No. 5,790,966, which is incorporated by reference) discloses a method for determining the position of a steering wheel in which the center position of the steering wheel is estimated with a first predefined algorithm or a second predefined algorithm, depending on whether a calculated steering wheel lock angle is inside or outside a certain interval. Relatively fast or relatively slow settling at a center position value occurs depending on the algorithm used.

DE 10 2008 063 567 A1, which is incorporated by reference, discloses a steering lock angle determining system for the fast and precise determination of the zero shift of a measured steering angle and therefore a fast and precise determination of the actual steering lock angle or steering angle of a vehicle. A calculated steering lock angle is determined from a measured yaw rate and the derivative of said steering lock angle over time is calculated. Furthermore, the derivative of the measured steering angle or steering lock angle over time is determined. If the deviation between the derivation of the measured steering lock angle and the derivation of the calculated steering lock angle undershoots a first threshold, the measured steering lock angle is corrected on the basis of a calculated steering lock angle, and otherwise the measurement and the subsequent calculations are repeated. Since the determination of the calculated steering lock angle is based on the known single-track model of a vehicle, it can be applied only under certain conditions, as described in M. Mitschke, Dynamik der Kraftfahrzeuge [Dynamics of Motor Vehicles], Volume C Fahrverhalten [Driving behavior], Springer, 1990, which is incorporated by reference. In the steering lock angle determining system there is provision for the quality of the correction to be described by means of a confidence interval. However, it has become apparent that this does not indicate with sufficient reliability whether the correction is valid.

SUMMARY OF THE INVENTION

An aspect of the present invention is specify a method and a system for determining a steering angle which quickly and reliably determine a correction constant for a measured steering angle and supply information about the validity of the correction constant.

A method is therefore made available in which the steering angle of a motor vehicle is determined, wherein a theoretical steering angle is calculated by means of a vehicle model and a measured steering angle is determined with a steering angle sensor, and the difference between the measured and theoretical steering angles is determined, wherein at least one data record comprising a number of successive measured values is acquired, and a correction constant for the measured steering angle is determined from the mean value of the differences between the theoretical steering angle and the measured steering angle. According to the invention, a confidence level, which changes incrementally between successive data records, is calculated by means of travel conditions present during the acquisition of the data record and/or an analysis of the data record.

A steering angle is understood here to be the steering wheel angle which indicates the angle by which the steering wheel is deflected with respect to its center position. The steering lock angle denotes the angle at which the steered wheels of a vehicle are with respect to the longitudinal axis of said vehicle. The steering lock angle δ and the steering wheel angle λ are linked to one another according to $$\delta = \lambda/K$$

where K denotes the constant steering transmission ratio. If the terms steering lock angle or steering angle are used below, these terms can be understood to be synonyms since the steering lock angle can be calculated directly from the steering angle, and vice versa. Therefore, it is also not significant whether measurement data relating to the steering angle are measurement data relating to the steering lock angle is made available.

An incrementally changing confidence level is understood here as meaning that said confidence level changes iteratively, wherein the confidence level is incremented or decremented by a value which is constant or is dependent on further conditions as a function of the travel conditions which are present during the acquisition of the data record and/or an analysis of the data record.

Since a number (N>=2) of successive measured values is determined, the method is robust with respect to individual incorrect measured values (or tuples of measured and theoretical steering angles and, if appropriate, further stored data). Furthermore, in an analysis of the data record it is possible to check whether, for example, particularly large variation points to travel conditions which are not sufficiently stable and/or measuring errors. By virtue of the fact that the travel conditions are acquired and considered, it is also possible to rule out a systematic error which is caused by driving states which are unsuitable for the vehicle model used, in particular the single track model which is known per se. An incremental change in the confidence level which is increased by a predefined value, for example when suitable conditions are present, permits a uniform consideration of statistical properties of the respective data record and of measuring conditions present during the acquisition. Furthermore, it is therefore possible, in a particularly easy way, for medium-term monitoring of measuring conditions and/or statistical quality of the data record to take place, permitting a particularly reliable correction constant to be obtained.

In addition to an incremental consideration of the confidence level, in one advantageous embodiment buffering of an averaged correction constant is also possible. In this context it is, in particular, also possible for weighted averaging to take place, wherein the weightings of the individual correction constants can be selected as a function of the confidence level prevailing during their determination.

A corrected steering angle is preferably determined from the measured steering angle and the correction constant and is passed on to other vehicle systems, in particular a system for vehicle dynamics control when the confidence level exceeds a first threshold value. In this context, the first threshold value is preferably selected such that, for example, a suitable steering angle is made available for a system for vehicle dynamics control at the earliest possible time.

The determination of new correction constants is expediently ended for the duration of an ignition run if the confidence level exceeds a second threshold value. In the course of an ignition run, that is to say a coherent period of time during which the ignition of the vehicle or the power supply was activated without interruption, the correction constant cannot change without being noticed. Therefore, as soon as a sufficiently precise value for the correction constant is present, a renewed determination can be dispensed with for the sake of more economical deployment of resources. In this context, the second threshold value for the confidence level is selected in such a way that travel conditions and/or a statistical analysis for a predefined number of data records have permitted meaningful evaluation, i.e. a reliable correction constant has been obtained. It is advantageous if the second threshold value is larger than the first threshold value, since a steering angle which is at least roughly corrected is then already available before the determination of the correction value is completely ended.

Preferably, a standard deviation of the determined differences and/or a correlation coefficient between the theoretical steering angle and the measured steering angle are/is calculated in an analysis of the data record. In this context, an empirical standard deviation of the determined differences and/or an empirical correlation coefficient is calculated which permit the best possible estimation of the standard deviation and/or of the correlation coefficient on the basis of a data record. A statistical analysis of the data record can be easily carried out and does not require any further data, but with the aid of the standard deviation and/or correlation coefficient it is possible to detect whether the data record contains seriously errored values and is unsuitable for an evaluation.

Possible errors of the correction constant are particularly preferably estimated by means of a confidence interval which depends on the standard deviation of the determined differences and preferably of the confidence level. On the basis of the statistical variation within a data record it is possible to calculate a confidence interval in order to specify at least one value for the statistical uncertainty of the correction constant. By virtue of the fact that a preferably additive term of the error is selected as a function of the confidence level, comprehensive consideration of both statistical and systematic errors of the correction constant can take place by means of one value.

The correction constant is particularly preferably determined from a data record only if the confidence interval undershoots a third threshold value and/or the correlation coefficient exceeds a fourth threshold value. Insofar as the confidence interval exceeds a third threshold value and/or the correlation coefficient undershoots a fourth threshold value, it is to be assumed that there has been a number of measuring errors and/or the travel conditions were not sufficiently stable.

The confidence level is preferably increased if, or only if, the confidence interval undershoots a fifth threshold value and/or the correlation coefficient exceeds a sixth threshold value. It is advantageous for the assessment of the reliability to increase the confidence level if (sufficient condition), or only if (necessary condition), the statistical analysis of the data record indicates a slight variation of the measurement data.

A plurality of data records are particularly preferably determined and evaluated, and the confidence level is increased if deviations between the correction constants which are determined from the individual data records and/or calculated correlation coefficients and/or confidence intervals dependent at least on the standard deviation of the determined differences undershoot/undershoots a seventh threshold value. The comparison of successive data records permits long-term and therefore particularly sensitive conclusions to be drawn about the reliability of the measurement.

It is advantageous if information relating to one or more of the following travel conditions: a speed of the vehicle, an activity of driving stability control systems, a yaw rate, a lateral acceleration, a change in the yaw rate over time, a longitudinal travel direction, an inclination of the vehicle, a change in the steering angle over time are evaluated for the determination of the confidence level. This data can be made available, for example, by a driving stability control system which to an increasing degree forms part of the standard equipment of modern vehicles. The validity of the vehicle model used can therefore be checked directly by means of the travel conditions.

It is particularly advantageous if the confidence level is increased if, or only if, the travel conditions correspond to stable straight-ahead travel or cornering without interventions by driving stability control systems. Since driving stability controllers intervene in unstable driving situations which are little suited to the determination of correction constants and, furthermore, the determined data, such as for example a vehicle speed which is determined from wheel speeds, are possibly not reliable during the activity of driving stability control systems, an increase in the confidence level in such situations would give a false impression of the reliability of the correction constant. By virtue of the fact that the confidence level is increased when, or only when, stable straight-ahead travel or cornering is present, said confidence level documents the presence of driving conditions which are suitable for determination of the correction constants. In this context, stable travel implies also that the driver does not change the steering angle at an excessively high speed.

When an ignition run ends, the corrected steering angle determined last is expediently stored in a nonvolatile memory module, and when a subsequent ignition run starts it is read out as a starting value. If a suitable value for the correction constant has been determined during travel or an ignition run, a starting value can be calculated taking into account the steering angle which is measured when the vehicle is stationary. During parking, the steering wheel angle does not change, in particular if a steering wheel lock is activated.

It is particularly expedient if at the start of the subsequent ignition run one or more new data records are determined and the deviation between a certain correction constant or certain correction constants and the starting value is calculated, and in that the confidence level is incremented to a predefined value if the deviation between a certain correction constant and the starting value undershoots an eighth threshold value. By virtue of the fact that at the start of the journey or of the ignition run it is tested whether the starting value corresponds to a correction constant determined from the evaluation of a few data records, it is possible to resort to said starting value and the complete determination of a new correction value which requires a multiplicity of data records does not occur.

The invention also relates to a control unit for determining a steering angle of a vehicle which receives at least information about a steering angle, a yaw rate and a vehicle speed via a suitable connection, in particular a vehicle data bus or means for inter-process communication, and a memory which can accommodate a plurality of chronologically successive data records and has at least one processor which evaluates the data records in a method as claimed in one of claims 1 to 10. The control unit can be specifically configured to process steering angle information or make available further functions. In this context "receive" can also mean that the control unit comprises means for measuring or determining the respective variables.

It is advantageous if at least one yaw rate sensor is indicated into the control unit, and the control unit comprises a means for receiving yaw data of a steering wheel angle sensor. As a result, at least some of the required variables can be determined directly in the control unit. A large number of vehicle models require information about a yaw rate of the vehicle; furthermore it is appropriate to process the raw data of a steering wheel angle sensor completely in a control unit which makes available corrected steering angle information to other vehicle systems, in particular via a vehicle data bus.

According to one preferred embodiment of the invention, the control unit comprises means for actuating wheel brakes, in particular at least one hydraulic valve and at least one electric pump, and at least one system for driving stability control, in particular a traction control and/or a vehicle dynamics control. As a result, a single control unit can make available both steering angle data processing and control of an electronic brake system with driving stability control. This permits a particularly efficient use of resources such as, for example, available computing power and also particularly easy exchange of data.

The correction constant and/or a measure of possible errors in the correction constant are/is preferably passed on via a suitable connection, in particular a vehicle data bus or means for inter-process communication, to other systems, in particular a system for driving stability control. For example a confidence interval can serve as a measure of possible errors in the correction constant.

Information relating to one or more of the following travel conditions, a speed of the vehicle, an activity of driving stability control systems, a yaw rate, a lateral acceleration, a change in the yaw rate over time, a longitudinal direction of travel, an inclination of the vehicle, a change in the steering angle over time, are expediently received from a further control unit, in particular a navigation system and/or a sensor cluster, via a vehicle data bus. Information about travel conditions which is made available by other control units can also be used for plausibility checking.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

Figure 1:
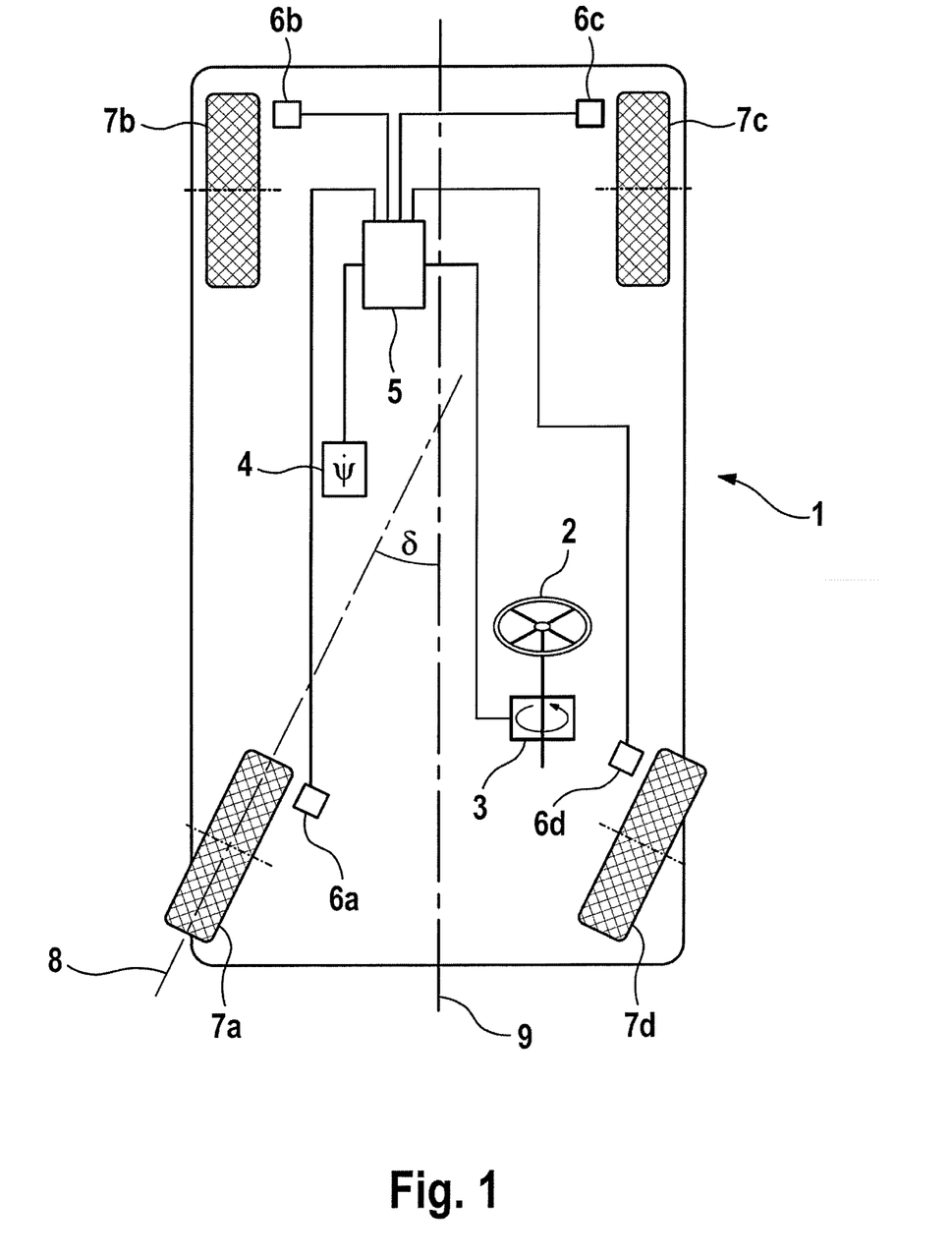
FIG. 1 shows a vehicle having a steering angle determining device.

FIG. 1 shows a schematic illustration of a vehicle which is equipped with a steering angle determining device. The vehicle 1 has two wheels 7a, 7d which are connected to a steering mechanism (not shown), and two non-steered wheels 7b, 7c. If steering wheel 2 is deflected by an angle λ, from the center position, the running direction 8 of the steered wheels is at a steering lock angle δ with respect to the longitudinal axis 9 of the vehicle. The steering wheel angle λ is measured with a relative steering wheel angle sensor 3 which is connected to a control unit 5. The wheel speed sensors 6a-6d and the yaw rate sensor 4 are also connected to the control unit 5. In this context, the connection can be made either via a specific line, as a result of which the control unit 5 can then also comprise a means for performing signal processing of the sensor signals, or the information of the sensors is fed to control unit 5 via a data bus such as, for example, a CAN or FlexRay bus.

The theoretical steering lock angle $\delta_{theo}$ is determined by means of a vehicle model such as, for example, the known single track model from the yaw rate $\dot{\psi}$ measured with the yaw rate sensor 4, the vehicle speed, constant properties of the vehicle and, if appropriate, further variables, and converted according to $$\lambda_{theo} = K \cdot \delta_{theo}$$

into a theoretical steering angle $\lambda_{theo}$; K denotes the (constant) steering transmission ratio.

The vehicle speed can be calculated according to known methods using the wheel speed sensors 6a-6d, and in the process it is possible, for example, to use the reference speed of a brake-slip control system. If the yaw rate $\dot{\psi}$ is estimated from a consideration of the wheel speeds, it is also possible to dispense with a yaw rate sensor 4. It is also possible to take into account the data from further sensors such as, for example, an acceleration sensor, in the calculation of the theoretical steering angle $\lambda_{theo}$. In addition to the determination of the steering angle, the open-loop and/or closed-loop control of a brake system can also be carried out by control unit 5 wherein driving stability control processes such as a brake-slip control process or a vehicle dynamics control process can be carried out by virtue of the fact that a wheel-specific build up or reduction in braking torque takes place.

Figure 2:
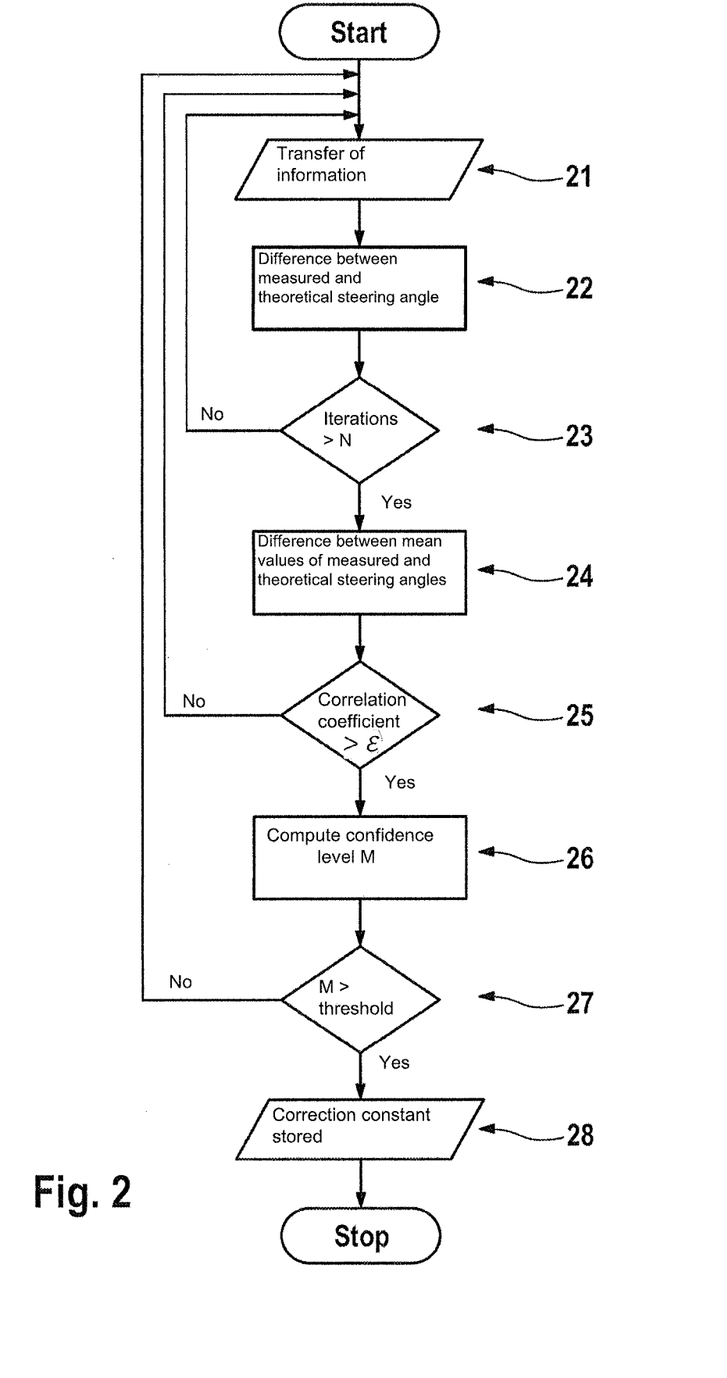
FIG. 2 shows a flowchart of the method according to an exemplary embodiment of the invention.

FIG. 2 shows the flowchart of a method according to an exemplary embodiment of the invention. Element 21 symbolizes the transfer of information relating to the travel conditions to the control unit. This information can comprise a vehicle speed, a display of the activity of driving stability control systems, the yaw rate, a yaw acceleration, a longitudinal direction of travel of the vehicle (i.e. forward travel or reverse travel), a lateral acceleration, an inclination of the vehicle and steering wheel sensor information.

In step 22, a theoretical steering angle $\lambda_{theo}$ is determined from the yaw rate, and a measured steering angle $\lambda_{meas}$ is determined from the data of the steering wheel angle sensor. The difference $\Delta$ between the measured steering angle and the theoretical steering angle is subsequently determined:

$$\Delta = \lambda_{meas} - \lambda_{theo}$$

Furthermore, the information is stored and a serial index i is increased.

In step 23 it is tested whether the serial index i reaches a predefined value N, for example 10. If this is not the case, the yaw rate and steering wheel angle are measured again and step 22 is carried out.

If the condition in step 23 is met, a data record is therefore present which comprises a number N of pairs of a theoretical steering angle and of a measured steering angle as well as the difference between the theoretical and measured steering angles. In step 24 the mean values of the measured steering angle $\lambda_{meas}$, theoretical steering angle $\lambda_{theo}$ and difference $\Delta$ are subsequently calculated for a data record:

$$\overline{\lambda}_{meas} = \frac{\sum_{i=1}^{N} \lambda_{meas_i}}{N}$$

$$\overline{\lambda}_{theo} = \frac{\sum_{i=1}^{N} \lambda_{theo_i}}{N}$$

$$\overline{\Delta} = \frac{\sum_{i=1}^{N} \Delta_i}{N}$$

Furthermore, the standard deviations, that is to say the route mean squares of the deviations of a measurement from the mean value of the data record, are determined:

$$\sigma_{\lambda_M} = \frac{\sqrt{\sum_{i=1}^{N} (\lambda_{meas_i} - \overline{\lambda}_{meas})^2}}{N}$$

$$\sigma_{\lambda_{theo}} = \frac{\sqrt{\sum_{i=1}^{N} (\lambda_{theo_i} - \overline{\lambda}_{theo})^2}}{N}$$

$$\sigma_{\Delta} = \frac{\sqrt{\sum_{i=1}^{N} (\Delta_i - \overline{\Delta})^2}}{N}$$

Subsequently, the correlation coefficient $R_\lambda$ between the measured steering angle and the calculated steering angle is determined:

$$R_\lambda = \frac{\sum_{i=1}^{N} ((\lambda_{theo_i} - \overline{\lambda}_{theo}) \cdot (\lambda_{meas_i} - \overline{\lambda}_{meas}))}{\sigma_{\lambda_M} \cdot \sigma_{\lambda_{theor}}}$$

In step 25 it is checked whether the correlation coefficient $R_\lambda$ exceeds a predefined threshold value $\epsilon$:

$$R_\lambda > \epsilon$$

Basically, the correlation coefficient must be in the interval between −1 and +1, wherein two independent variables have a correlation coefficient of 0 within the scope of the measuring and computational accuracy. If the correlation coefficient $R_\lambda$ exceeds a predefined threshold value, it is assumed that $\overline{\Delta}$ is a suitable correction constant for the correction of a measured steering angle. If this is not the case, the yaw rate and steering wheel angle are measured again and the calculations are carried out from step 22.

If, on the other hand, the condition is met, in step 26 the possible error of the correction constant is estimated. This estimation is carried out according to the formula $$I = A \cdot \sigma_\Delta + B.$$

where I is the confidence interval of the corrected steering angle, A is a constant which is dependent on the number N, and B denotes a value which is dependent on a confidence level M.

B can, for example, therefore correspond to a constant maximum value which is reduced by a value which is proportional to the confidence level or at least increases monotonously. An error B which is proportional to the reciprocal value 1/M of the confidence level can also be used for the calculation of the confidence interval I.

The confidence level M is preferably determined as a function of the travel conditions, and therefore M can, for example, be increased by a predefined increment if the steering wheel angle speed undershoots a predefined threshold value over a predefined time period, and no driving stability control system is or has been activated.

Alternatively or additionally to a consideration of the travel conditions, the confidence level M can be modified as a function of whether the confidence level I undershoots a predefined threshold value S:

$$I < S$$

If, for example, the confidence level M has a maximum value of 16, it could be increased by 1 as soon as the condition relating to the confidence level I is met. Furthermore, this increase can also be made dependent on whether certain travel conditions are present, for example stable straight-ahead travel or cornering, during which the driver has not rotated the steering wheel with a speed above a threshold value and a driving stability control system was not activated.

In step 27 it is checked whether the confidence level M exceeds a predefined termination threshold value (given a maximum confidence level of 16, a suitable termination threshold value may be, for example, 12).

If this is not the case, the yaw rate and steering wheel angle are measured again until a new data record has been obtained and evaluated. If the condition is met, in step 28 the correction constant is stored and no further data records are determined. The correction constant and confidence interval and/or confidence level are used by vehicle control systems such as the electronic stability program (ESC) to obtain corrected steering angles $\lambda_K = \lambda_{meas} - \overline{\Delta}$, and to assess the accuracy thereof.

Figure 3:
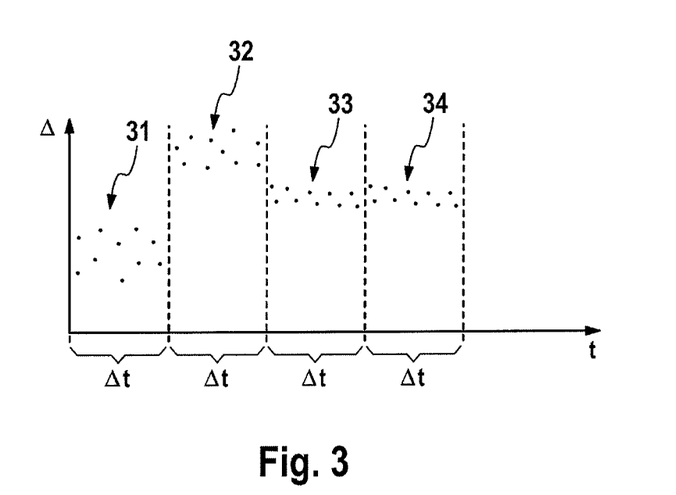
FIG. 3 shows a diagram of the differences between the measured steering angle and the calculated steering angle which can occur when a method according to the invention is carried out.

FIG. 3 shows a diagram in which the difference between the measured steering angle and the calculated steering angle is represented for a number of data records 31-34, wherein the abscissa indicates the time. The data record is determined during a time period Δt. According to one exemplary embodiment of the invention, the variation of the data within a data record and the difference between the mean values of successive data records are considered. If the variation of the data is above a threshold, as is the case for example with the data record 31, further data records are determined. If the mean values of two successive data records differ from one another greatly, as is the case, for example, with the data records 32 and 33, the determination of new data records is also continued. Only if both the variation within a data record and the difference between the mean values of the successive data records each undershoot a predefined threshold value, as is represented, for example, in the case of the data records 33 and 34, the determination of new data records can be ended and the correction constant can be stored. According to one preferred embodiment of the invention, a comparison of successive data records is a necessary and/or sufficient condition for increasing the confidence level. In one particularly preferred embodiment of the invention, mean value formation takes place over the correction constants of a plurality of successive data records.

Figure 4:
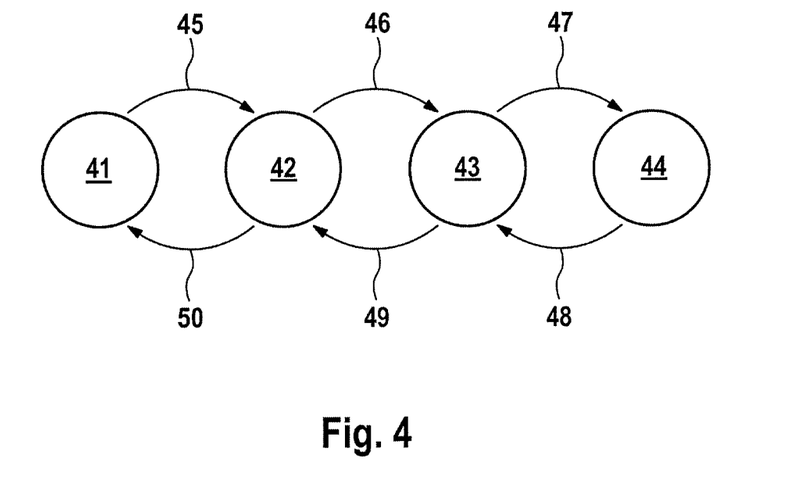
FIG. 4 shows a scheme of the hierarchy of the confidence levels.

FIG. 4 shows a scheme of the hierarchy of the confidence levels, wherein 41-44 denote the individual confidence levels, 45-47 indicate conditions for increasing a confidence level, and 48-50 indicate conditions for reducing a confidence level. At the start of a journey, the confidence level is set to a low value 41, and a data record of measured values is determined and evaluated. If the condition 45 is met, that is to say for example the confidence interval is below a predefined threshold value, the confidence level is increased to a value 42. A data record of measured values is then determined and evaluated, and condition 46 is checked, which condition 46 can correspond to condition 45 or, for example, additionally requires the presence of straight-ahead travel. When condition 46 is met, the confidence level changes to the value 43. A data record of measured values is determined and evaluated again. If condition 47 is met, that is to say, for example, the deviations between the correction constants which are determined for the individual data records undershoot a predefined threshold value, the confidence level is set to the value 44 and the method is ended. If the checking of a condition for increasing the confidence level reveals that said condition is not met, the corresponding condition is expediently checked for a reduction in the confidence level. In this context, the conditions 48-50 can either be the same or different, depending on the current confidence level. For example, the confidence level could be reduced if the empirical standard deviation of a data record exceeds a predefined threshold value.

According to one further preferred embodiment of the invention, the deviation between the instantaneous difference between the theoretical steering angle and the measured steering angle is calculated with the mean value of the difference between the theoretical steering angle and the measured steering angle over the current data record or the preceding data record. The correction constant is calculated only when this deviation undershoots a threshold value:

$$\tilde{\Delta}_i = \Delta_i - \overline{\Delta} < \epsilon_1$$

According to a further preferred embodiment of the invention, the standard deviation of the difference between the theoretical steering angle and the measured steering angle of the current data record is calculated. The correction constant is calculated only when this difference undershoots a threshold value:

$$\sigma_\Delta < \epsilon_2$$

According to one particularly preferred embodiment of the invention, both the deviation of the instantaneous difference between the theoretical steering angle and the measured steering angle from the mean value of the difference between the theoretical steering angle and the measured steering angle of the current or last data record and the standard deviation of the difference between the theoretical steering angle and the measured steering angle of the current data record are calculated. The correction constant is calculated only when these deviations are both below a respectively predefined threshold value:

$$\tilde{\Delta}_i < \epsilon_1$$

$$\sigma_\Delta < \epsilon_2$$

According to one further preferred embodiment of the invention, the travel conditions, which are to be understood as including the speed of the vehicle and/or activity of the vehicle control system and/or yaw rate and/or lateral acceleration and/or change in the yaw rate over time and/or longitudinal direction of travel and/or inclination of the vehicle, are monitored during the determination of a data record, and a confidence level M is assigned to a data record. It is particularly expedient if a stored confidence level M is incremented or decremented as a function of the change in the travel conditions during the determination of this data record. The correction value is calculated only when the confidence level M exceeds a predefined threshold value.

According to a further preferred embodiment of the invention, the changes over time in the mean values, calculated in individual data records, for the between theoretical steering angle and measured steering angle are monitored. If these changes undershoot a predefined threshold value, the confidence level M is increased:

$$\tilde{\Delta}_i < \epsilon_3$$

$$(\epsilon_3 < \epsilon_1)$$

According to a further preferred embodiment of the invention, the standard deviation of the difference between the theoretical steering angle and the measured steering angle is considered over a plurality of data records. If these changes undershoot a predefined threshold value, the confidence level M is increased:

$$\sigma_\Delta < \epsilon_4$$

$$(\epsilon_4 < \epsilon_2)$$

According to a further preferred embodiment of the invention, the confidence level is increased further if both the changes in the mean values, calculated in individual data records, for the between the theoretical steering angle and the measured steering angle and the standard deviation of the difference between the theoretical steering angle and the measured steering angle over a plurality of data records in each case undershoot predefined threshold values:

$$\tilde{\Delta}_i < \epsilon_3$$

$$(\epsilon_3 < \epsilon_1)$$

$$\sigma_\Delta < \epsilon_4$$

$$(\epsilon_4 < \epsilon_2)$$

According to a further preferred embodiment of the invention, the possible error of the correction constant is estimated according to the formula $$I = A \cdot \sigma_\Delta + B,$$

where I denotes the confidence interval of the corrected steering angle, A denotes a constant which is dependent on the number N and B denotes a value which is dependent on the confidence level M. If the confidence interval I undershoots a predefined threshold value S, $$I < S,$$

the correction constant and confidence interval are stored and no further data records are determined. The stored values are transferred to driving stability control systems such as an ESC and used by these to calculate the current steering angle and preferably an estimation of the error:

$$\Delta_0 = \overline{\Delta}$$

$$I_0 = I$$

$$\lambda_i = \lambda_{M_i} \cdot \Delta_0$$

According to a further preferred embodiment of the invention, at the end of a journey (or of an ignition run), a starting value for the correction constant is determined and stored over and beyond the current driving process. At the start of a new journey, the starting value is read out and used as a correction constant. New data records are expediently determined and a new correction constant and a confidence level are calculated. If the difference between the starting value and a newly calculated correction constant undershoots a predefined threshold and the confidence level exceeds a further predefined threshold, the starting value for the duration of the journey is retained as a correction constant and no further data records are determined.

It is to be noted that the features and/or conditions of various embodiments can also be combined as desired.

The invention claimed is:

1. A method in which the steering angle of a motor vehicle is determined, comprising:
   calculating, by a vehicle model based on a yaw rate of the vehicle, a plurality of theoretical steering angles in a data record,
   determining, with a steering angle sensor, a plurality of measured steering angles in the data record,
   determining a plurality of difference values between the plurality of measured steering angles and the plurality of theoretical steering angles in the data record,
   determining, a correlation coefficient between the plurality of measured steering angles and the plurality of theoretical steering angles,
   in response to the correlation coefficient exceeding a correlation threshold:
      determining a correction constant for correcting the measured steering angles in the data record, the correction constant being based on a mean value of the plurality of difference values,
      calculating, based on at least one of a variation of the plurality of measured steering angles in the data record and a comparison between the correction constant in the data record and another correction constant in another data record, a confidence level of the correction constant, which changes incrementally between successive data records,
   in response to the confidence level exceeding a confidence threshold that indicates that both the variation of the plurality of measured steering angles in the data record and the comparison between the correction constant in the data record and the other correction constant in the other data record are less than respective thresholds, storing the correction constant for use by a control system of the motor vehicle, and
   in response to the correlation coefficient not exceeding the correlation threshold or the confidence level not exceeding the confidence threshold, determining a new data record.

2. The method as claimed in claim 1, wherein a corrected steering angle is determined from the measured steering angle and the correction constant and is passed on to other vehicle systems, in particular a system for vehicle dynamics control when the confidence level exceeds a first threshold value.

3. The method as claimed in claim 1, wherein the determination of new correction constants is ended for the duration of an ignition run if the confidence level exceeds the confidence threshold.

4. The method as claimed in claim 1, wherein a standard deviation of the determined differences is calculated in an analysis of the data record.

5. The method as claimed in claim 4, wherein possible errors of the correction constant are estimated by a confidence interval which depends on the standard deviation of the determined differences and preferably of the confidence level.

6. The method as claimed in claim 4, wherein the correction constant is determined from a data record only if the confidence interval undershoots a third threshold value and/or the correlation coefficient exceeds a fourth threshold value.

7. The method as claimed in claim 4, wherein the confidence level is increased if, or only if, the confidence interval undershoots a fifth threshold value and/or the correlation coefficient exceeds a sixth threshold value.

8. The method as claimed in claim 4, wherein a plurality of data records are determined and evaluated, and the confidence level is increased if deviations between the correction constants which are determined from the individual data records and/or calculated correlation coefficients and/or confidence intervals dependent at least on the standard deviation of the determined differences undershoot/undershoots a seventh threshold value.

9. The method as claimed in claim 1, wherein information relating to one or more of the following travel conditions: a speed of the vehicle, an activity of driving stability control systems, a yaw rate, a lateral acceleration, a change in the yaw rte over time, a longitudinal travel direction, an inclination of the vehicle, a change in the steering angle over time are evaluated for the determination of the confidence level.

10. The method as claimed in claim 9, wherein the confidence level is increased if, or only if, the travel conditions correspond to stable straight-ahead travel or cornering without interventions by driving stability control systems.

11. The method as claimed in claim 1, wherein when an ignition run ends, the corrected steering angle determined last is stored in a nonvolatile memory module, and when a subsequent ignition run starts it is read out as a starting value.

12. The method as claimed in claim 11, wherein at the start of the subsequent ignition run one or more new data records are determined and the deviation between a certain correction constant or certain correction constants and the starting value is calculated, and the confidence level is incremented to a predefined value if the deviation between a certain correction constant and the starting value undershoots an eighth threshold value.

* * * * *